US011412499B2

(12) United States Patent
Ji et al.

(10) Patent No.: US 11,412,499 B2
(45) Date of Patent: Aug. 9, 2022

(54) METHOD OF ALLOCATING CHANNEL ESTIMATION NUMBER FOR SEARCH SPACE AND TERMINAL DEVICE

(71) Applicant: VIVO MOBILE COMMUNICATION CO., LTD., Guangdong (CN)

(72) Inventors: Zichao Ji, Chang'an Dongguan (CN); Xueming Pan, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 16 days.

(21) Appl. No.: 16/969,185

(22) PCT Filed: Feb. 1, 2019

(86) PCT No.: PCT/CN2019/074413
§ 371 (c)(1),
(2) Date: Aug. 11, 2020

(87) PCT Pub. No.: WO2019/154324
PCT Pub. Date: Aug. 15, 2019

(65) Prior Publication Data
US 2020/0396725 A1    Dec. 17, 2020

(30) Foreign Application Priority Data
Feb. 12, 2018  (CN) .......................... 201810147561.2

(51) Int. Cl.
*H04W 72/04* (2009.01)
*H04L 1/00* (2006.01)
*H04L 5/00* (2006.01)

(52) U.S. Cl.
CPC ......... *H04W 72/042* (2013.01); *H04L 1/0038* (2013.01); *H04L 5/0051* (2013.01); *H04W 72/044* (2013.01); *H04W 72/048* (2013.01)

(58) Field of Classification Search
CPC ............ H04W 72/042; H04W 72/044; H04W 72/048; H04W 72/04; H04L 1/0038; H04L 5/0051
(Continued)

(56) References Cited

U.S. PATENT DOCUMENTS

2010/0279628 A1* 11/2010 Love ...................... H04L 5/003
455/70
2012/0155316 A1   6/2012 Li et al.
(Continued)

FOREIGN PATENT DOCUMENTS

CN    103139819 A    6/2013
CN    104717748 A    6/2015
(Continued)

OTHER PUBLICATIONS

Huawei et al., 'Summary of Remaining Issues on PDCCH Monitoring with TP', R1-1800062, 3GPP TSG RAN WG1 Ad Hoc Meeting Vancouver, Canada, Jan. 22-26, 2018.
(Continued)

*Primary Examiner* — Candal Elpenord
(74) *Attorney, Agent, or Firm* — Maschoff Brennan

(57) ABSTRACT

A method of allocating a channel estimation number for a search space and a terminal device are provided. The method includes: reallocating, if a channel estimation number required for a target unit search space of a terminal device exceeds a first channel estimation number, the channel estimation number corresponding to the target unit search space, wherein, the first channel estimation number is a channel estimation number configured by a network-side device for the target unit search space or a maximum channel estimation number supported by the terminal device; a sum of second channel estimation numbers of the
(Continued)

target unit search space after reallocating is less than or equal to the first channel estimation number.

8 Claims, 3 Drawing Sheets

(58) Field of Classification Search
USPC .................................................. 370/329–330
See application file for complete search history.

(56) References Cited

U.S. PATENT DOCUMENTS

| | | | |
|---|---|---|---|
| 2013/0100921 A1 | 4/2013 | Nakao et al. | |
| 2017/0006584 A1 | 1/2017 | Ren et al. | |
| 2018/0013528 A1 | 1/2018 | Yamada et al. | |
| 2018/0027574 A1* | 1/2018 | Lee | H04L 1/1671 370/329 |
| 2019/0081686 A1* | 3/2019 | Wang | H04L 5/0096 |
| 2019/0215098 A1* | 7/2019 | Tiirola | H04L 25/0238 |
| 2021/0084620 A1* | 3/2021 | Tooher | H04W 72/1247 |

FOREIGN PATENT DOCUMENTS

| | | |
|---|---|---|
| CN | 105610562 A | 5/2016 |
| CN | 105871527 A | 8/2016 |
| EP | 3 738 255 A1 | 11/2020 |
| JP | 2021-510969 A | 4/2021 |
| WO | 2016/169047 A1 | 10/2016 |

OTHER PUBLICATIONS

Samsung, Corrections on Search Space Design, R1-1800443, 3GPP TSG RAN WG1 Meeting AH 1801, Vancouver, Canada, Jan. 22-26, 2018.
Extended European Search Report issued in corresponding application No. 19750551.4, dated Feb. 25, 2021.
CN Office Action in Application No. 201810147561.2 dated Mar. 19, 2020.
"On reducing the PDCCH channel estimation and BD complexity in NR" 3GPP TSG RAN WG1 Ad Hoc 1801, Jan. 22, 2018.
Written Opinion and International Search Report in Application No. PCT/CN2019/074413 dated Aug. 27, 2020.
JP Office Action in Application No. 2020-543086 dated Sep. 28, 2021.
"On remaining issues of search spaces and blind detection" 3GPP TSG RAN WG1 Meeting AH 1801, R1-1800631, InterDigital Inc., Jan. 22, 2018.
LG Electronics, Remaining Issues on Search Space, R1-1800372, 3GPP TSG RAN WG1 Meeting AH 1801, Vancouver, Canada, Jan. 22-26, 2018.
Korean Office Action issued in corresponding application No. 10-2020-7026160, dated Feb. 17, 2022.

* cited by examiner

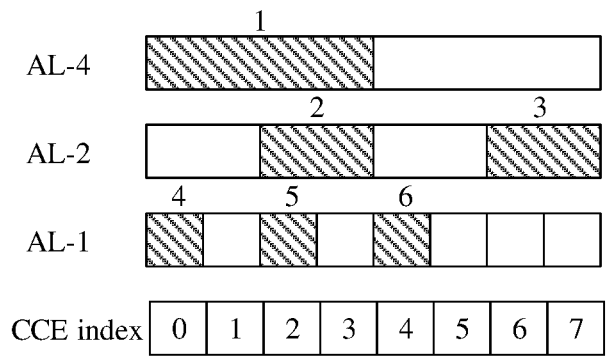
Fig.1
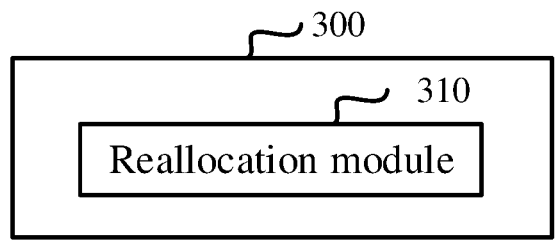
Fig.2
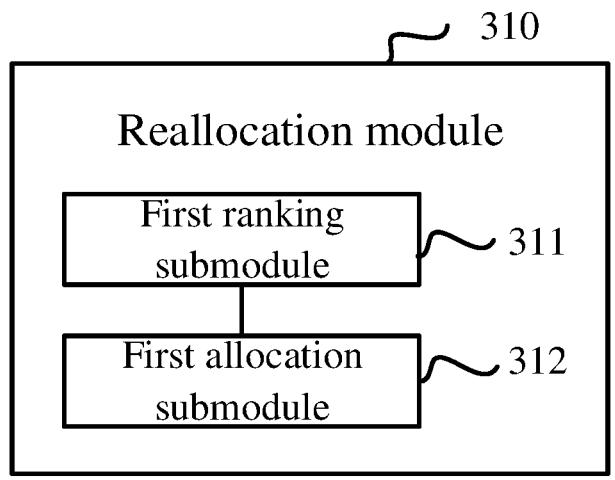
Fig.3
Fig.4

METHOD OF ALLOCATING CHANNEL ESTIMATION NUMBER FOR SEARCH SPACE AND TERMINAL DEVICE

CROSS-REFERENCE TO RELATED APPLICATION

This application is a U.S. national phase application of a PCT Application No. PCT/CN2019/074413 filed on Feb. 1, 2019, which claims a priority to a Chinese patent application No. 201810147561.2 filed in China on Feb. 12, 2018, a disclosure of which is incorporated herein by reference in its entirety.

TECHNICAL FIELD

The present disclosure relates to the field of communications technology or terminal, and in particular, relates to a method of allocating a channel estimation number for a search space and a terminal device.

BACKGROUND

In a Long Term Evolution (LTE) system, a User Equipment (UE) only listens one Physical Downlink Control Channel (PDCCH). In the PDCCH, the UE blindly detects PDCCH candidates in a fixed search space, and tries to demodulate Downlink Control Information (DCI). A total number of the PDCCH candidates blindly detected is determined. A Cell-specific Reference Signal (CRS) is used for channel estimation on the PDCCH. Since the CRS is cell-specific, complexity of the channel estimation by the UE does not increase linearly with the number of blind detection.

In a $5^{th}$ Generation (5G) New Radio (NR) system, a case that multiple control resource sets (Control Resource Set, CORESET) and multiple search spaces are configured for a UE is supported, the number of blind detection is flexibly configured for each search space, and the CORESETs are flexibly associated with the search spaces. On the other hand, a case that a UE-specific demodulation reference signal (UE-specific Demodulation Reference Signal, URS) is used for the UE to perform channel estimation is supported on a PDCCH of the NR system. In addition, in order to reduce implementation complexity of the UE, the NR system also specifies the maximum channel estimation number for the UE per unit time, that is, a sum of channel estimation numbers in all search spaces cannot exceed an upper limit.

A control channel element (Control Channel Element, CCE) is taken as a unit for channel estimation performed by the UE. PDCCH candidates allocated with a same CCE can share a result of channel estimation. In the NR system, positions of PDCCH candidates (equivalent to numbers of CCEs with which the PDCCH candidates are allocated) at different aggregation levels (Aggregation Level, AL) in a search space are determined by a pseudo-random function (Hash function). Therefore, according to a Hash result of the Hash function, the CCEs with which the PDCCH candidates at different ALs are allocated may be the same or may be different. Therefore, at different time points, the total number of channel estimations required for blind detection of a search space is also different, and may exceed the maximum channel estimation number supported by the UE.

If the search space is configured based on the channel estimation number required in the worst case (that is, assuming that CCEs allocated for candidates at different ALs will never overlap), then although the configuration can be ensured that the maximum channel estimation number supported by the UE is not exceeded, the configuration will greatly reduce the number of blind detection allowed to be configured, which will cause the channel estimation number far less than the maximum channel estimation number supported by the UE may only be used in the system. This allocation manner cannot make full use of UE capability, greatly reduces a utilization rate of control resources of the system, and improves a blocking probability of allocation of control channels.

SUMMARY

An objective of the embodiments of the present disclosure is to provide a method of allocating a channel estimation number for a search space and a terminal device, to make full use of processing capacity of the terminal device, maximize allocation of control resources, reduce blocking probability of allocation of control channels, and at the same time ensure that a maximum channel estimation number of the terminal device is not exceeded.

In a first aspect, some embodiments of the present disclosure provide a method of allocating a channel estimation number for a search space, and the method is applied to a terminal device and includes: reallocating, if a channel estimation number required for a target unit search space of a terminal device exceeds a first channel estimation number, the channel estimation number corresponding to the target unit search space, wherein, the first channel estimation number is a channel estimation number configured by a network-side device for the target unit search space or a maximum channel estimation number supported by the terminal device; wherein a sum of second channel estimation numbers of the target unit search space after reallocating is less than or equal to the first channel estimation number.

In a second aspect, some embodiments of the present disclosure provide a terminal device, and the terminal device includes: a reallocation module, used to reallocate, if a channel estimation number required for a target unit search space of a terminal device exceeds a first channel estimation number, the channel estimation number corresponding to the target unit search space, wherein, the first channel estimation number is a channel estimation number configured by a network-side device for the target unit search space or a maximum channel estimation number supported by the terminal device; wherein a sum of second channel estimation numbers of the target unit search space after reallocating is less than or equal to the first channel estimation number.

In a third aspect, some embodiments of the present disclosure provide a terminal device, and the terminal device includes a processor, a storage and a computer program stored on the storage and executable by the processor, wherein, in a case that the program is executed by the processor, the processor implements the steps of the method described in the first aspect.

In a fourth aspect, some embodiments of the present disclosure provide a computer readable storage medium, storing therein a computer program, wherein, in a case that the program is executed by a processor, the processor implements steps of the method described in the first aspect.

The method in some embodiments of the present disclosure may achieve at least one of the following beneficial effects.

On one hand, in a case that a channel estimation number required for a target unit search space of a terminal device exceeds a channel estimation number configured by a network-side device for the target unit search space or a maximum channel estimation number supported by the UE, the channel estimation number corresponding to the target unit search space is reallocated, such that it may make full use of a processing capacity of the terminal device, maximize allocation of control resources, reduce blocking probability of allocation of control channels, and ensure that the channel estimation number configured by the network-side device is not exceeded.

BRIEF DESCRIPTION OF THE DRAWINGS

The drawings described herein are used to provide a further understanding of the present disclosure and constitute a part of the present disclosure. The exemplary embodiments of the present disclosure and the description thereof are used to explain the present disclosure, and do not constitute an improper limitation on the present disclosure. In the drawings:

FIG. 1 is a flowchart of a method of allocating channel estimation number for a search space according to an embodiment of the present disclosure.

FIG. 2 is a schematic diagram of a scenario for allocation of PDCCH candidates at different aggregation levels according to an embodiment of the present disclosure.

FIG. 3 is a schematic structural diagram of a terminal device according to an embodiment of the present disclosure.

FIG. 4 is a schematic structural diagram of a reallocation module according to an embodiment of the present disclosure.

DETAILED DESCRIPTION

Figure 5:
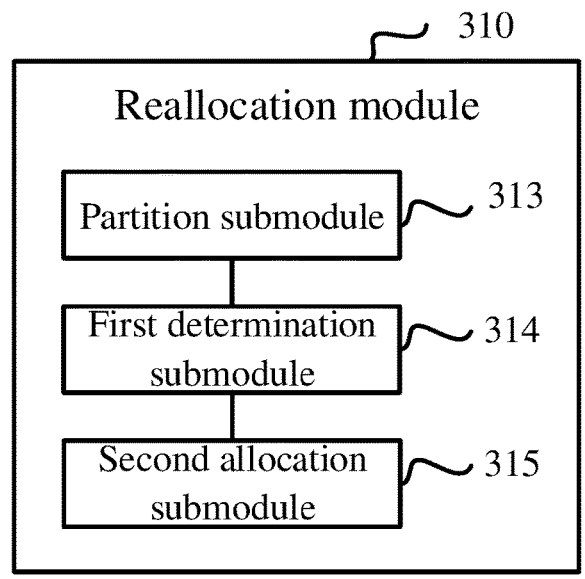
FIG. 5 is a schematic structural diagram of a reallocation module according to another embodiment of the present disclosure.

The technical solutions of embodiments of the present disclosure will be clearly and completely described below with reference to the drawings of embodiments of the present disclosure. Apparently, the described embodiments are some embodiments of the present disclosure, but are not all the embodiments. Based on the embodiments of the present disclosure, all other embodiments derived by a person of ordinary skill in the art without any creative effort shall fall within the scope of the present disclosure.

The technical solution of the present disclosure may be applied to various communication systems, such as a global system of mobile communication (GSM, Global System of Mobile communication) system, a code division multiple access (CDMA, Code Division Multiple Access) system, and a wideband code division multiple access (WCDMA, Wideband Code Division Multiple Access) system, a general packet radio service (GPRS, General Packet Radio Service) system, a long term evolution (LTE, Long Term Evolution)/long term evolution advanced (LTE-A, Long Term Evolution Advanced) system, and a NR (New Radio) system, etc.

A user equipment (UE, User Equipment), also called a mobile terminal (Mobile Terminal), mobile user equipment, etc., may communicate with one or more core networks via a radio access network (RAN, Radio Access Network), and the UE may be a mobile terminal, such as a mobile phone (or referred to as "cellular" phone) and a computer having a mobile terminal, for example, a portable device, a pocket device, a handheld device, a computer built-in device or an in-vehicle mobile device that exchanges language and/or data with a wireless access network.

A base station may be a base transceiver station (Base Transceiver Station, BTS) in GSM or CDMA, a base station (NodeB) in WCDMA, or an evolved base station (eNB or e-NodeB, evolved Node B) in the LTE and a 5G base station (gNB), which is not limited in the present disclosure, but for the convenience of description, the gNB is taken as an example for description in the following embodiments.

The technical solutions provided in various embodiments of the present disclosure will be described in detail below with reference to the accompanying drawings.

FIG. 1 is a flowchart of a method of allocating a channel estimation number for a search space according to an embodiment of the present disclosure; the method in FIG. 1 may be applied to a terminal device. The method includes a step S101.

Step S101: reallocating, if a channel estimation number required for a target unit search space of a terminal device exceeds a first channel estimation number, the channel estimation number corresponding to the target unit search space, wherein, the first channel estimation number is a channel estimation number configured by a network-side device for the target unit search space or a maximum channel estimation number supported by the terminal device; wherein a sum of a second channel estimation number of the target unit search space after reallocating is less than or equal to the first channel estimation number.

In some embodiments of the present disclosure, in a case that a channel estimation number required for a target unit search space of a terminal device exceeds a channel estimation number configured by a network-side device for the target unit search space or a maximum channel estimation number supported by the UE, the channel estimation number corresponding to the target unit search space is reallocated, such that it may make full use of a processing capacity of the terminal device, maximize allocation of control resources, reduce blocking probability of allocation of control channels, and ensure that the channel estimation number configured by the network-side device is not exceeded.

Of course, it should be understood that, in some embodiments of the present disclosure, when the first channel estimation number is compared with the maximum channel estimation number, the comparison is performed within the same time unit. For example, the first channel estimation number refers to a first channel estimation number of the terminal device in a time unit. The maximum channel estimation number supported by the terminal device also refers to a maximum channel estimation number supported by the terminal device in a time unit. The time unit here may be a subframe, a time slot, or a symbol, etc., which is not limited in some embodiments of the present disclosure.

Further, step S101 may be specifically implemented as: reallocating the channel estimation number corresponding to the target unit search space based on a predetermined parameter; wherein the predetermined parameter includes at least one of: a aggregation level of a PDCCH candidate, a scheduling type of a PDCCH candidate, a service type of a PDCCH candidate, a type of a scheduled cell or carrier, a subcarrier spacing of a scheduled cell or carrier, a DCI format carried in a PDCCH candidate in a search space, and a quantity of PDCCH candidates in the search space.

Optionally, in some embodiments of the present disclosure, reallocating the channel estimation number corresponding to the target unit search space based on the predetermined parameter may include: prioritizing the PDCCH candidates in the target unit search space based on the predetermined parameter; discarding a PDCCH candidate with a low priority level until the channel estimation number corresponding to the target unit search space is less than or equal to the first channel estimation number.

For example, it is assumed that the predetermined parameter includes a type of a scheduled cell. It is assumed that the network-side device configures a UE-specific search space for the UE, and the search space schedules a primary cell and a secondary cell at the same time.

The UE may determine that priority levels of PDCCH candidates of the primary cell are higher than priority levels of PDCCH candidates of the secondary cell.

If a channel estimation number for the search space allocated by the UE at a certain moment is less than a channel estimation number required for blind detection of all PDCCH candidates in the search space, the UE may preferentially satisfy a channel estimation number required for scheduling the PDCCH candidates of the primary cell, and then allocate a remaining channel estimation number for scheduling the PDCCH candidates of the secondary cell.

Optionally, in some embodiments, step S101 may be specifically implemented as: partitioning PDCCH candidates in the target unit search space into multiple PDCCH candidate sets according to aggregation levels; determining a discarding order of PDCCH candidates in each PDCCH candidate set based on Control Channel Element (CCE) numbers corresponding to the PDCCH candidates; discarding, by polling the multiple PDCCH candidate sets, a PDCCH candidate with a highest discarding rank in the order in each of the multiple PDCCH candidate sets until the channel estimation number corresponding to the target unit search space is less than or equal to the first channel estimation number.

For example, it is assumed that a network configures a UE-specific search space for the UE, the number of blind detection times for AL-4 is 2, the number of blind detection times for AL-2 is 4, and the number of blind detection times for AL-1 is 4.

If a maximum channel estimation number for the search space allocated by the UE at a certain moment is less than a channel estimation number required for blind detection of all PDCCH candidates in the search space, then the UE may choose to discard PDCCH candidates in an ascending order of the ALs from smallest to largest and in an ascending order of CCE numbers from smallest to largest. For example, a PDCCH candidate at AL-1 with the minimum CCE number is discarded firstly, and then a PDCCH candidate at AL-2 with the minimum CCE number is discarded, and so on. If there is no PDCCH candidate at a larger AL, the discarding process restarts from the AL-1 until a required channel estimation number is less than the maximum channel estimation number allocated for the search space.

Optionally, in some embodiments, step S101 may be specifically implemented as: determining a CCE corresponding to PDCCH candidates at each aggregation level in the target unit search space; classifying the PDCCH candidates at each aggregation level in the target unit search space, wherein CCEs corresponding to PDCCH candidates of a first type do not overlap with CCEs corresponding to other PDCCH candidates in a Control Resource Set (CORESET) associated with the target unit search space, PDCCH candidates of a second type share a CCE with PDCCH candidates at a lower aggregation level, PDCCH candidates of a third type share a CCE with PDCCH candidates at a higher aggregation level; circularly executing following steps to adjust an overbooking channel estimation number until the overbooking channel estimation number is less than or equal to zero: a) determining an equivalent channel estimation number of each PDCCH candidate in the target unit search space, and determining the overbooking channel estimation number, wherein the overbooking channel estimation number is equal to a channel estimation number actually required for the target unit search space minus the first channel estimation number; b) selecting and discarding a target PDCCH candidate from the PDCCH candidates of the first type or the second type in the target unit search space; c) subtracting an equivalent channel estimation number corresponding to the target PDCCH candidate from the overbooking channel estimation number and obtaining an adjusted overbooking channel estimation number.

It should be understood that, in some embodiments of the present disclosure, PDCCH candidates may be classified into three types: a first type, a second type, and a third type. Of course, it is not excluded at more types of PDCCH candidates are classified.

It should be understood that, in some embodiments of the present disclosure, there may be one or more search spaces in a CORESET, and in this case, the CORESET is a CORESET associated with the one or more search spaces.

It should be understood that CCEs corresponding to the PDCCH candidates may include CCEs allocated for or occupied by the PDCCH candidates.

Of course, it should be understood that the above-mentioned PDCCH candidates of the first type may also satisfy the following condition instead: a CCE corresponding to the PDCCH candidates of the first type does not overlap with a CCE corresponding to other PDCCH candidates in the target unit search space.

Further, determining the equivalent channel estimation number of each PDCCH candidate in the target unit search space includes: determining an aggregation level of a first PDCCH candidate of the first type as an equivalent channel estimation number of the first PDCCH candidate; determining a quantity of CCEs, not overlapping with CCEs corresponding to other PDCCH candidates in the CORESET associated with the target unit search space, among CCEs allocated for a second PDCCH candidate of the second type as an equivalent channel estimation number of the second PDCCH candidate; determining an equivalent channel estimation number of a third PDCCH candidate of the third type as 0.

Of course, there may also be other solutions for determining the equivalent channel estimation number of PDCCH candidates, in some embodiments of the present disclosure, which will not be listed one by one here.

It should be understood that solutions for selecting the target PDCCH candidate from the PDCCH candidates of the first type or the second type in the target unit search space may be predefined, such as specified in a protocol, or configured by a network side, which are not limited in the embodiments of the present disclosure.

For example, selecting and discarding the target PDCCH candidate from the PDCCH candidates of the first type or the second type in the target unit search space may include: alternately selecting and discarding a target PDCCH candidate from the PDCCH candidates of the first type and from the PDCCH candidates of the second type in the target unit search space; or, selecting and discarding a target PDCCH candidate from PDCCH candidates of the first type in the target unit search space, and selecting and discarding a target PDCCH candidate from the PDCCH candidates of the second type in the target unit search space in a case that PDCCH candidates of the first type in the target unit search space are empty; or, selecting and discarding a target PDCCH candidate from PDCCH candidates of the second type in the target unit search space, and selecting and discarding a target PDCCH candidate from the PDCCH candidates of the first type in the target unit search space in a case that PDCCH candidates of the second type in the target unit search space are empty; or, preferentially selecting a PDCCH candidate, whose equivalent channel estimation number is closest to the overbooking channel estimation number, among PDCCH candidates of the first type or the second type in the target unit search space as a target PDCCH candidate.

Of course, it should be understood that, in a case that there are multiple PDCCH candidates whose equivalent channel estimation numbers are closest to the overbooking channel estimation number, a target PDCCH candidate is selected, in an ascending order of aggregation levels from smallest to largest, from the multiple PDCCH candidates whose equivalent channel estimation numbers are closest to the overbooking channel estimation number; in a case that there are multiple PDCCH candidates at the lowest aggregation level among the PDCCH candidates whose equivalent channel estimation numbers are closest to the overbooking channel estimation number, a PDCCH candidate with the maximum or minimum CCE number is selected, according to an order of CCE numbers corresponding to the PDCCH candidates, from the multiple PDCCH candidates at the lowest aggregation level as a target PDCCH candidate.

For ease of understanding, an example is described below with reference to FIG. 2. FIG. 2 is a schematic diagram of a scenario for an allocation of PDCCH candidates at different aggregation levels according to another embodiment of the present disclosure.

Step 1: assuming that, according to a hash function of a search space, CCEs allocated for (or occupied by) blind detection candidates at each AL at a certain time are determined as shown in FIG. 2.

Step 2: classifying the blind detection candidates into three types, wherein blind detection candidates 3 and 6 are a first type, blind detection candidate 1 is a second type, and blind detection candidates 2, 4 and 5 are a third type.

Step 3: calculating an equivalent channel estimation number (EC) of each blind detection candidate, wherein an EC of the blind detection candidate 3 is equal to 2 (EC=2), an EC of the blind detection candidate 6 is equal to 1 (EC=1); an EC of the blind detection candidate 1 is equal to 1 (EC=1); an EC of each of the blind detection candidates 2, 4 and 5 is equal to 0 (EC=0).

Step 4: selecting and discarding a blind detection candidate based on an overbooking channel estimation number (X). If the X=2, then the blind detection candidate 3 is selected; if the X=1, the blind detection candidate 6 or 1 is selected. A blind detection candidate at a low AL is preferably selected, namely the blind detection candidate 6 is preferably selected.

Figure 7:
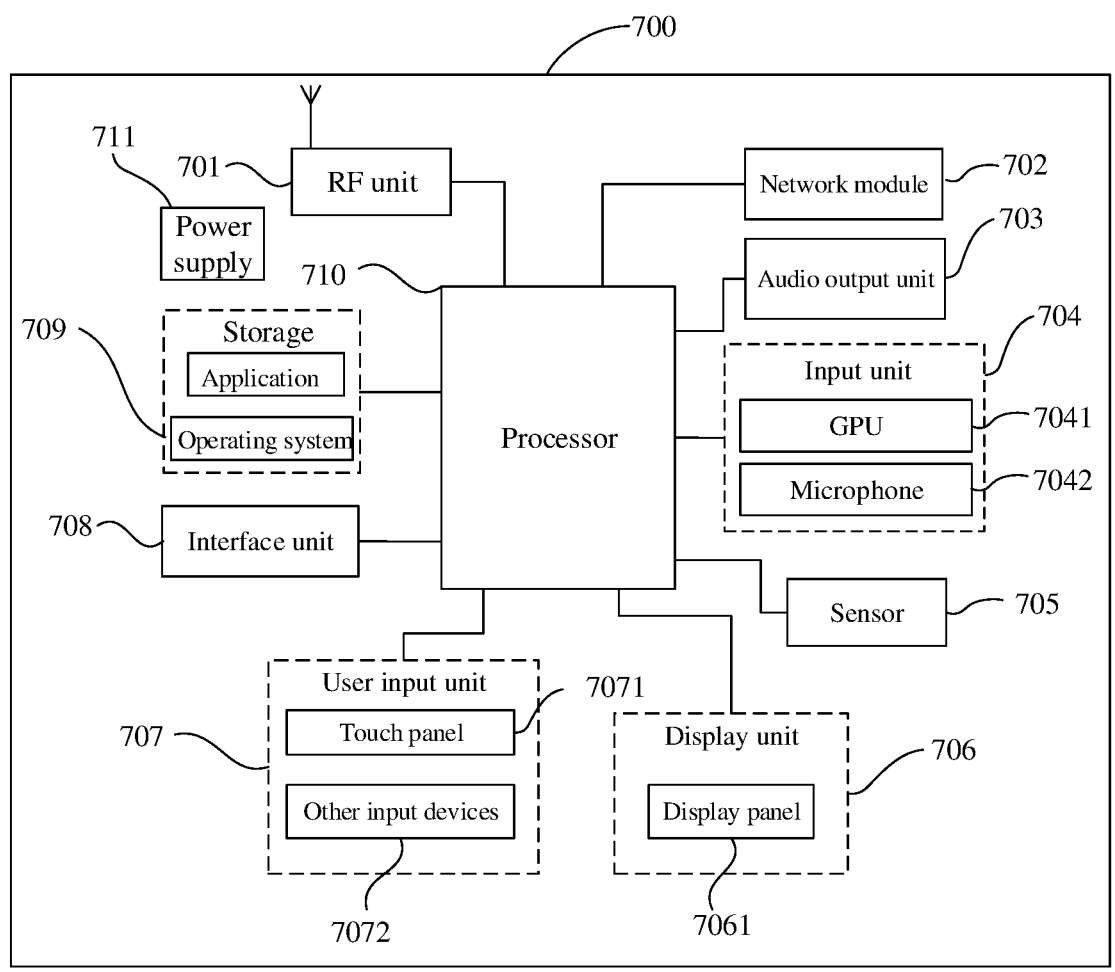
FIG. 7 is a schematic structural diagram of a terminal device according to a further embodiment of the present disclosure.

FIG. 7 is a schematic structural diagram of a terminal device according to various embodiments of the present disclosure. A terminal device 700 includes, but is not limited to, a radio frequency unit 701, a network module 702, and an audio output unit 703, an input unit 704, a sensor 705, a display unit 706, a user input unit 707, an interface unit 708, a storage 709, a processor 710, and a power supply 711 and other components. Those skilled in the art may understand that the structure of the terminal device shown in FIG. 7 does not constitute a limitation on the terminal device, and the terminal device may include more or fewer components than shown in the figure, or some combined components, or different arrangements of components. In some embodiments of the present disclosure, the terminal device includes, but is not limited to, a mobile phone, a tablet computer, a notebook computer, a palmtop computer, a car terminal, a wearable device, a pedometer, and the like.

The processor 710 is used for: reallocating, if a channel estimation number required for a target unit search space of a terminal device exceeds a first channel estimation number, the channel estimation number corresponding to the target unit search space, wherein, the first channel estimation number is a channel estimation number configured by a network-side device for the target unit search space or a maximum channel estimation number supported by the terminal device; a sum of second channel estimation numbers of the target unit search space after the reallocating is less than or equal to the first channel estimation number.

It should be understood that, in some embodiments of the present disclosure, the radio frequency unit 701 may be used to receive and send information or send and receive signals during a call. Specifically, downlink data from a base station is received and processed by the processor 710; in addition, uplink data is sent to the base station. Generally, the radio frequency unit 701 includes, but is not limited to, an antenna, at least one amplifier, a transceiver, a coupler, a low-noise amplifier, a duplexer, and the like. In addition, the radio frequency unit 701 may also communicate with a network and other devices through a wireless communication system.

The terminal device provides users with wireless broadband Internet access through the network module 702, such as helping users to send and receive emails, to browse web pages, and to access streaming media, etc.

The audio output unit 703 may convert audio data received by the radio frequency unit 701 or the network module 702 or stored in the storage 709 into audio signals and output them as sound. Moreover, the audio output unit 703 may also provide audio output (for example, call signal reception sound, message reception sound, etc.) related to a specific function performed by the terminal device 700. The audio output unit 703 includes a speaker, a buzzer, a receiver, and the like.

The input unit 704 is used to receive audio signals or video signals. The input unit 704 may include a graphics processing unit (Graphics Processing Unit, GPU) 7041 and a microphone 7042, and the graphics processing unit 7041 processes image data of a still picture or video obtained by an image capture device (such as a camera) in a video capture mode or an image capture mode. The processed image frames may be displayed on the display unit 706. The image frames processed by the graphics processing unit 7041 may be stored in the storage 709 (or other storage medium) or transmitted via the radio frequency unit 701 or the network module 702. The microphone 7042 may receive sound, and may process such sound into audio data. The processed audio data may be converted into an output format that may be transmitted to a mobile communication base station via the radio frequency unit 701 in the case of a telephone call mode.

The terminal device 700 further includes at least one sensor 705, such as a light sensor, a motion sensor, and other sensors. Specifically, the light sensor includes an ambient light sensor and a proximity sensor, wherein the ambient light sensor may adjust brightness of a display panel 7061 according to brightness of the ambient light, and the proximity sensor may turn off the display panel 7061 and/or the backlight in a case that the terminal device 700 is moved to an ear. As a type of the motion sensor, an accelerometer sensor may detect a magnitude of acceleration in various directions (usually three axes), and detect a magnitude and direction of gravity in the case of stationary, and be used to identify attitude of the terminal device (such as horizontal-vertical screen switching, related games, magnetometer attitude calibration), vibration-recognition related functions (such as a pedometer, tap), etc.; the sensor 705 may also include a fingerprint sensor, a pressure sensor, an iris sensor, a molecular sensor, a gyroscope, a barometer, a hygrometer, a thermometer, an infrared sensor and the like, which are not repeated here.

The display unit 706 may be configured to display information inputted by the user or information provided to the user. The display unit 706 may include the display panel 7061, and the display panel 7061 may be configured as a form of a liquid crystal display (LCD, Liquid Crystal Display), an organic light-emitting diode (OLED, Organic Light-Emitting Diode) or the like.

The user input unit 707 may be used to receive numeric information or character information inputted by a user and generate a signal input related to the user's settings and related to function control of the terminal device. Specifically, the user input unit 707 includes a touch panel 7071 and other input devices 7072. The touch panel 7071, also referred to as a touch screen, may collect the user's touch operations thereon or nearby (such as the user's operation on the touch panel 7071 or near the touch panel 7071 using any suitable object or accessory such as a finger or a stylus). The touch panel 7071 may include two parts, namely a touch detection device and a touch controller. The touch detection device detects the touch orientation of the user, and detects a signal generated by the touch operation, and transmits the signal to the touch controller; the touch controller receives touch information from the touch detection device, converts the touch information into a coordinate of a touch point, transmits the coordinate to the processor 710, and may receive and execute a command from the processor 710. In addition, the touch panel 7071 can be implemented in various types such as a resistive type, a capacitive type, an infrared type, and a surface acoustic wave type, etc. Besides the touch panel 7071, the user input unit 707 may further include other input devices 7072. Specifically, the other input devices 7072 may include, but are not limited to, a physical keyboard, a function button (such as a volume control button, a switch button, etc.), a trackball, a mouse, and a joystick, and details thereof are not described herein again.

Further, the touch panel 7071 may cover the display panel 7061, in a case that the touch screen 7071 detects a touch operation thereon or nearby, the touch operation is transmitted to the processor 710 to determine the type of the touch event, then the processor 710 provides a corresponding visual output on the display screen 7061 based on the type of the touch event. Although in FIG. 7, the touch panel 7071 and the display panel 7061 are implemented as two independent components to implement input and output functions of the terminal device, in some embodiments, the touch panel 7071 and the display panel 7061 may be integrated to implement the input and output functions of the terminal device, which are not limited here.

The interface unit 708 is an interface through which an external device is connected to the terminal device 700. For example, the external device may include a wired or wireless headset port, an external power supply (or battery charger) port, a wired or wireless data port, a storage card port, a port for connecting a device with an identification module, and an audio input/output (I/O) port, a video I/O port, or a headphone port, etc. The interface unit 708 may be used to receive input (e.g., data information, power, etc.) from the external device and transmit the received input to one or more elements within the terminal device 700 or may be used to transmit data between the terminal device 700 and the external device.

The storage 709 may be used to store software programs and various data. The storage 709 may mainly include a storage program area and a storage data area, wherein the storage program area may store an operating system, an application program (such as a sound playback function, an image playback function, etc.) required for at least one function, and the like; the storage data area may store data (such as audio data, a phone book, etc.) created based on the use of a mobile phone and the like. In addition, the storage 709 may include a high-speed random access storage, and may further include a non-volatile storage, such as at least one magnetic disk storage device, a flash memory device, or other volatile solid-state storage device.

The processor 710 is a control center of the terminal device, and uses various interfaces and lines to connect various parts of the entire terminal device. By running or executing software programs and/or modules stored in the storage 709 and calling data stored in the storage 709, various functions of the terminal device and processing data are performed, so that the overall monitoring of the terminal device is performed. The processor 710 may include one or more processing units; optionally, the processor 710 may integrate an application processor and a modem processor, wherein the application processor mainly processes an operating system, a user interface, and an application program, etc. The modem processor mainly handles wireless communication. It could be understood that the modem processor may not be integrated into the processor 710.

The terminal device 700 may further include a power supply 711 (such as a battery) for supplying power to various components. Optionally, the power supply 711 may be logically connected to the processor 710 through a power management system, so as to implement functions such as management of charging, management of discharging, and power consumption management through the power management system.

In addition, the terminal device 700 includes some functional modules that are not shown, and details thereof are not described herein again.

Optionally, some embodiments of the present disclosure further provide a terminal, and the terminal includes: a processor 710, a storage 709, and a computer program stored in the storage 709 and executable on the processor 710, when the computer program is executed by the processor 710, the processor 710 implements various processes in the method embodiment of FIG. 1 or FIG. 4, and the same technical effect may be achieved, which will not be repeated herein to avoid repetition.

Some embodiments of the present disclosure also provide a computer readable storage medium, a computer program is stored on the computer readable storage medium. When the computer program is executed by a processor, the processor implements various processes in the method embodiment of FIG. 1 or FIG. 4, and the same technical effect may be achieved, which will not be repeated herein to avoid repetition. The computer readable storage medium may be, for example, a read-only memory (Read-Only Memory, ROM), a random access memory (Random Access Memory, RAM), a magnetic disk or an optical disk, etc.

It should be noted that, the terms "including" and "having" and any variations thereof herein are intended to cover non-exclusive inclusions, such that a process, method, article, or device that includes a plurality of elements includes not only those elements but also other elements not explicitly listed, or elements that are inherent to such a process, method, article, or device. An element defined after a phrase "comprising a . . . " does not exclude the presence of additional identical elements in the process, method, article, or device that comprises the element, without further limitation.

Through the description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present disclosure essentially or a part thereof contributing to the prior art may be embodied in the form of a computer software product which may be stored in a storage medium (e.g., a ROM/RAM, a magnetic disk or an optical disk) and which includes several instructions to cause a terminal (which may be a personal computer, a server, an air-conditioner or a network device, etc.) to perform the methods described in the various embodiment of the present disclosure.

The embodiments of the present disclosure are described above with reference to the accompanying drawings, but the present disclosure is not limited to the above-mentioned specific embodiments, and the above-mentioned specific embodiments are only illustrative and not restrictive. A person of ordinary skill in the art with hints of the present disclosure may also make many forms that fall within the protection scope of the present disclosure without departing from the spirit of the present disclosure and the scope protected by the claims of the present disclosure.

It should be noted that, in some embodiments of the present disclosure, the target unit search space may include a search space; or, the target unit search space may include a search space group, and the search space group includes multiple search spaces; or, the target unit search space may include all search spaces associated with a CORESET.

FIG. 3 is a schematic structural diagram of a terminal device 300 according to an embodiment of the present disclosure. As shown in FIG. 3, the terminal device 300 may include: a reallocation module 310, used to reallocate, if a channel estimation number required for a target unit search space of a terminal device exceeds a first channel estimation number, the channel estimation number corresponding to the target unit search space, wherein, the first channel estimation number is a channel estimation number configured by a network-side device for the target unit search space or a channel estimation number acquired after the terminal device performs the first allocation for the target unit search space; a sum of second channel estimation numbers of the target unit search space after the reallocating is less than or equal to the first channel estimation number.

Further, the reallocation module 310 is specifically used to: reallocate the channel estimation number corresponding to the target unit search space based on a predetermined parameter; wherein the predetermined parameter includes at least one of: aggregation levels of PDCCH candidates, scheduling types of PDCCH candidates, service types of PDCCH candidates, types of a scheduled cell or carrier, a subcarrier spacing of a scheduled cell or carrier, DCI formats carried by PDCCH candidate in the search space, and a quantity of PDCCH candidates in the search space.

FIG. 4 is a schematic structural diagram of a reallocation module according to an embodiment of the present disclosure. Optionally, in some embodiments, a reallocation module 310 of a terminal device 300 may be as shown in FIG. 4, and the reallocation module 310 includes: a first ranking submodule 311, used to prioritize the PDCCH candidates in the target unit search space based on the predetermined parameter; a first allocation submodule 312, used to discard a PDCCH candidate with a low priority level until the channel estimation number corresponding to the target unit search space is less than or equal to the first channel estimation number.

FIG. 5 is a schematic structural diagram of a reallocation module according to another embodiment of the present disclosure. Optionally, in some embodiments, a reallocation module 310 of a terminal device 300 may be as shown in FIG. 4, and the reallocation module 310 includes: a partition submodule 313, used to partition PDCCH candidates in the target unit search space into multiple PDCCH candidate sets according to aggregation levels; a first determination submodule 314, used to determine a discarding order of PDCCH candidates in each PDCCH candidate set based on Control Channel Element (CCE) numbers corresponding to the PDCCH candidates; a second allocation submodule 315, used to discard, by polling the multiple PDCCH candidate sets, a PDCCH candidate with a highest discarding rank in the order in each of the multiple PDCCH candidate sets until the channel estimation number corresponding to the target unit search space is less than or equal to the first channel estimation number.

Figure 6:
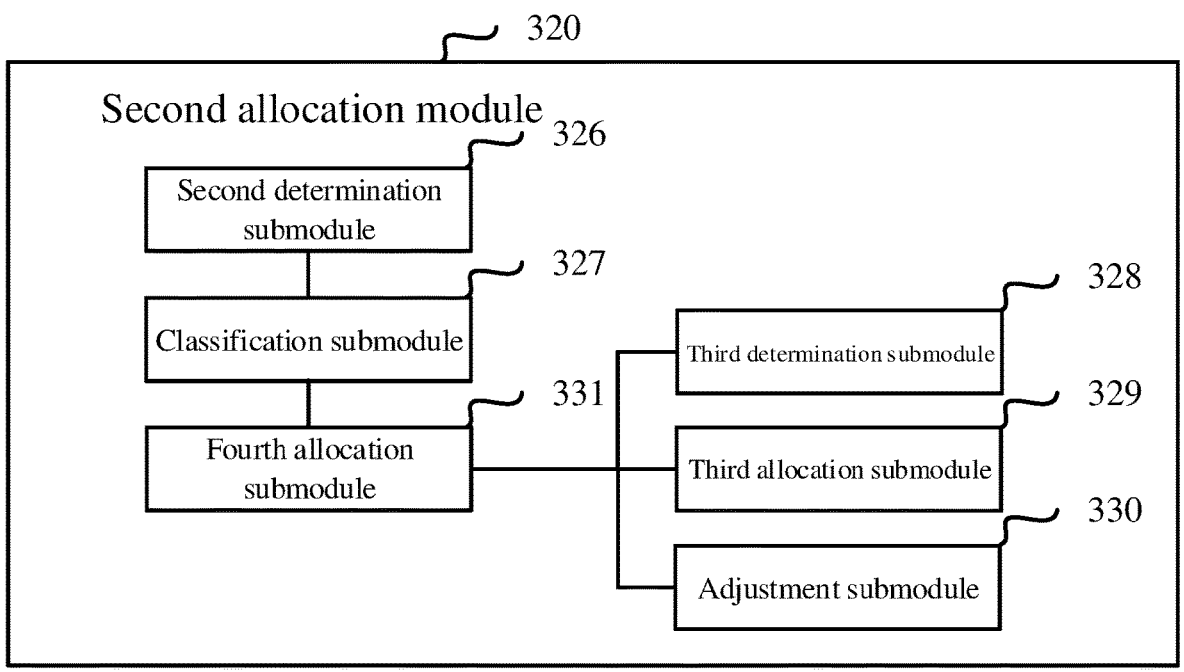
FIG. 6 is a schematic structural diagram of a reallocation module according to still another embodiment of the present disclosure.

FIG. 6 is a schematic structural diagram of a reallocation module according to still another embodiment of the present disclosure. Optionally, in some embodiments, a reallocation module 310 of a terminal device 300 may be as shown in FIG. 4, and the reallocation module 310 includes: a second determination submodule 316, used to determine CCEs corresponding to PDCCH candidates at each aggregation level in the target unit search space; a classification submodule 317, used to classify the PDCCH candidates at each aggregation level in the target unit search space, wherein CCEs corresponding to PDCCH candidates of a first type do not overlap with CCEs corresponding to other PDCCH candidates in a Control Resource Set (CORESET) associated with the target unit search space, PDCCH candidates of a second type share a CCE with PDCCH candidates at a lower aggregation level, PDCCH candidates of a third type share a CCE with PDCCH candidates at a higher aggregation level; a third determination submodule 318, used to determine an equivalent channel estimation number of each PDCCH candidate in the target unit search space, and determine the overbooking channel estimation number, wherein the overbooking channel estimation number is equal to a channel estimation number actually required for the target unit search space minus the first channel estimation number; a third allocation submodule 319, used to select and discard a target PDCCH candidate from the PDCCH candidates of the first type or the second type in the target unit search space; an adjustment submodule 320, used to subtract an equivalent channel estimation number corresponding to the target PDCCH candidate from the overbooking channel estimation number and obtain an adjusted overbooking channel estimation number; a fourth allocation submodule 321, used to circularly call the fourth determination submodule, the fifth reallocation submodule and the adjustment submodule to adjust the overbooking channel estimation number until the overbooking channel estimation number is less than or equal to zero.

Further, the third determination submodule 318 is specifically used to: determine an aggregation level of a first PDCCH candidate of the first type as an equivalent channel estimation number of the first PDCCH candidate; determine a quantity of CCEs, not overlapping with CCEs corresponding to other PDCCH candidates in the CORESET associated with the target unit search space, among CCEs allocated for a second PDCCH candidate of the second type as an equivalent channel estimation number of the second PDCCH candidate; determine an equivalent channel estimation number of a third PDCCH candidate of the third type as 0.

Optionally, the target unit search space includes a search space; or, the target unit search space includes a search space group, and the search space group includes multiple search spaces; or, the target unit search space includes all search spaces associated with a CORESET.

The terminal device 300 may also execute the method executed by the terminal device or the UE in the embodiment shown in FIG. 1. Specific implementation of the terminal device 300 may be obtained by referring to the embodiment shown in FIG. 1 and will not be repeated here.

It should be noted that, the terms "including" and "comprising" and any variations thereof herein are intended to cover non-exclusive inclusions, such that a process, method, article, or device that includes a plurality of elements includes not only those elements but also other elements not explicitly listed, or elements that are inherent to such a process, method, article, or device. An element defined after a phrase "comprising a . . . " does not exclude the presence of additional identical elements in the process, method, article, or device that comprises the element, without further limitation.

Through the description of the foregoing embodiments, it is clear to those skilled in the art that the foregoing method embodiments may be implemented by software plus a necessary general hardware platform, and certainly may also be implemented by hardware, but in many cases, the former is a better implementation. Based upon such understanding, the technical solutions of the present disclosure essentially or a part thereof contributing to the prior art may be embodied in the form of a computer software product which may be stored in a storage medium (e.g., a ROM/RAM, a magnetic disk or an optical disk) and which includes several instructions to cause a terminal (which may be a personal computer, a server, an air-conditioner or a network device, etc.) to perform the methods described in the various embodiment of the present disclosure.

The embodiments of the present disclosure are described above with reference to the accompanying drawings, but the present disclosure is not limited to the above-mentioned specific embodiments, and the above-mentioned specific embodiments are only illustrative and not restrictive. A person of ordinary skill in the art with hints of the present disclosure may also make many forms that fall within the protection scope of the present disclosure without departing from the spirit of the present disclosure and the scope protected by the claims of the present disclosure.

What is claimed is:

1. A method of allocating a channel estimation number for a search space, comprising:
   reallocating, if a channel estimation number required for a target unit search space of a terminal device exceeds a first channel estimation number, the channel estimation number corresponding to the target unit search space,
   wherein, the first channel estimation number is a channel estimation number configured by a network-side device for the target unit search space or a maximum channel estimation number supported by the terminal device; wherein a sum of second channel estimation numbers of the target unit search space after reallocating is less than or equal to the first channel estimation number,
   wherein,
   reallocating the channel estimation number corresponding to the target unit search space comprises:
      partitioning PDCCH candidates in the target unit search space into multiple PDCCH candidate sets according to aggregation levels;
      determining a discarding order of PDCCH candidates in each PDCCH candidate set based on Control Channel Element (CCE) numbers corresponding to the PDCCH candidates;
      discarding, by polling the multiple PDCCH candidate sets, a PDCCH candidate with a highest discarding rank in the order in each of the multiple PDCCH candidate sets until the channel estimation number corresponding to the target unit search space is less than or equal to the first channel estimation number.

2. The method according to claim 1, wherein,
   the target unit search space comprises a search space; or
   the target unit search space comprises a search space group, and the search space group comprises multiple search spaces; or
   the target unit search space comprises all search spaces associated with a Control Resource Set (CORESET).

3. A non-transitory computer readable storage medium, storing therein a computer program, wherein, in a case that the program is executed by a processor, the processor implements steps of the method according to claim 1.

4. The non-transitory computer readable storage medium according to claim 3, wherein, the target unit search space comprises a search space; or
   the target unit search space comprises a search space group, and the search space group comprises multiple search spaces; or
   the target unit search space comprises all search spaces associated with a Control Resource Set (CORESET).

5. A terminal device, comprising:
   a reallocation circuit, used to reallocate, if a channel estimation number required for a target unit search space of a terminal device exceeds a first channel estimation number, the channel estimation number corresponding to the target unit search space,
   wherein, the first channel estimation number is a channel estimation number configured by a network-side device for the target unit search space or a maximum channel estimation number supported by the terminal device; wherein a sum of second channel estimation numbers of the target unit search space after reallocating is less than or equal to the first channel estimation number,
   wherein,
   the reallocation circuit comprises:
      a partition subcircuit, used to partition PDCCH candidates in the target unit search space into multiple PDCCH candidate sets according to aggregation levels;
      a first determination subcircuit, used to determine a discarding order of PDCCH candidates in each PDCCH candidate set based on Control Channel Element (CCE) numbers corresponding to the PDCCH candidates;

a reallocation subcircuit, used to discard, by polling the multiple PDCCH candidate sets, a PDCCH candidate with a highest discarding rank in the order in each of the multiple PDCCH candidate sets until the channel estimation number corresponding to the target unit search space is less than or equal to the first channel estimation number.

6. The terminal device according to claim 5, wherein,
the target unit search space comprises a search space; or
the target unit search space comprises a search space group, and the search space group comprises multiple search spaces; or
the target unit search space comprises all search spaces associated with a Control Resource Set (CORESET).

7. A terminal device, comprising a storage, a processor and a computer program stored on the storage and executable by the processor, wherein, in a case that the program is executed by the processor, the processor implements a method of allocating a channel estimation number for a search space, the method comprises following steps:

reallocating, if a channel estimation number required for a target unit search space of a terminal device exceeds a first channel estimation number, the channel estimation number corresponding to the target unit search space, wherein, the first channel estimation number is a channel estimation number configured by a network-side device for the target unit search space or a maximum channel estimation number supported by the terminal device;

wherein a sum of second channel estimation numbers of the target unit search space after reallocating is less than or equal to the first channel estimation number, wherein, reallocating the channel estimation number corresponding to the target unit search space comprises:

partitioning PDCCH candidates in the target unit search space into multiple PDCCH candidate sets according to aggregation levels;

determining a discarding order of PDCCH candidates in each PDCCH candidate set based on Control Channel Element (CCE) numbers corresponding to the PDCCH candidates;

discarding, by polling the multiple PDCCH candidate sets, a PDCCH candidate with a highest discarding rank in the order in each of the multiple PDCCH candidate sets until the channel estimation number corresponding to the target unit search space is less than or equal to the first channel estimation number.

8. The terminal device according to claim 7, wherein, the target unit search space comprises a search space; or
the target unit search space comprises a search space group, and the search space group comprises multiple search spaces; or
the target unit search space comprises all search spaces associated with a Control Resource Set (CORESET).

* * * * *